United States Patent [19]

Ehlers

[11] 3,786,343

[45] Jan. 15, 1974

[54] BATTERY MONITOR SYSTEM
[75] Inventor: John G. Ehlers, San Diego, Calif.
[73] Assignee: The United States of America as represented by the Secretary of the Navy, Washington, D.C.
[22] Filed: Mar. 19, 1973
[21] Appl. No.: 342,349

[52] U.S. Cl. .............................................. 324/29.5
[51] Int. Cl. .......................................... G01m 27/02
[58] Field of Search..................... 324/29.5; 340/249

[56] References Cited
UNITED STATES PATENTS
3,487,295  12/1969  Nocera et al. ..................... 324/29.5
3,546,576  12/1970  Frezzolini .......................... 324/29.5

Primary Examiner—Alfred E. Smith
Attorney—Richard S. Sciascia, Ervin F. Johnston and William F. Skeer

[57] ABSTRACT

A monitoring system for a multicell storage battery periodically scans the voltage of each cell and indicates highest and lowest individual cell voltages. The system has provisions for a printout of the cell voltages of each cell to assist in locating defective cells.

10 Claims, 5 Drawing Figures

PATENTED JAN 15 1974 3,786,343

BATTERY MONITOR SYSTEM

STATEMENT OF GOVERNMENT INTEREST

The invention described herein may be manufactured and used by or for the Government of the United States of America for governmental purposes without the payment of any royalties thereon or therefor.

FIELD OF INVENTION

This invention pertains to the field of electricity and, in particular, that branch thereof having to do with battery and condenser charging and discharging. By way of further characterization, the invention is directed to control responsive systems indicating the condition of battery charge and including indicating, signalling and testing structure. By way of further characterization, but not by way of limitation thereto, the invention will be described as it pertains to a battery monitoring system for an electrically propelled vehicle.

DESCRIPTION OF THE PRIOR ART

The advantages of electric drive propulsion means for enclosed vehicles has long been recognized. Originally, the electrical energy was stored in conventional lead-acid wet cells and a variety of charging and monitoring circuits have been developed for such systems. There are many advantages of this type of power source and continual research and effort has been directed toward replacing lead-acid storage cells with a more reliable and serviceable arrangement. One such arrangement employs silver-zinc batteries. These batteries are much more compact than their lead-acid counterparts for an equivalent energy storage capability and, additionally, offer many safety features not present in the lead-acid arrangement.

However, the silver-zinc batteries develop internal shorts which cause excessive heat in either the charging or the discharging cycle. The excessive heat causes mechanical failure of the particular shorted cell and ofttimes causes damage to adjacent cells. The cells having internal short circuits are termed "hot cells" because of the destructive heat generated within the cell due to the short circuit.

In research vessels and other compact manned vehicles, the placement of the electric storage batteries is such that they are inaccessible for routine visual inspection. For this reason, a test system to periodically inspect the batteries for "hot cells" is necessary. Typically, the test systems provided for electric storage batteries in such applications indicate the existence of the low cell but still require manual inspection of the battery packs to locate the particular defective cell. Although prior art systems are known which indicate individual cell conditions in submarine vehicles, as shown in U. S. Pat. No. 2,745,090 issued on May 8, 1956 to Joseph Girillo for "Battery Cell Voltage Comparison System," for example, they have not proven entirely satisfactory with the silver-zinc batteries or in systems, especially when used in both the charge and discharge modes.

Prior art systems are also known which compare individual cell voltages with a standard voltage and are arranged to provide an alarm when any cell deviates from the comparison standard voltage by an amount in excess of established limits. While such systems are valuable and have their place in the battery testing technology, they do not permit operational discretion in relation to the state of the charge and the amount of drain or charging current flowing through the battery. As a result, false alarms with such systems are frequent and troublesome such that genuine indications are frequently overlooked.

SUMMARY OF THE INVENTION

The invention is directed to a monitoring system to be used in conjunction with silver-zinc battery systems. The monitoring system periodically measures the individual cell voltages of the battery power supply and indicates both the highest individual cell voltage read and the lowest individual cell voltage read. When the system indicates an abnormal variance from the anticipated values, the system locates the defective cell. Operational personnel may then remove it from the circuit to effectively prevent heat damage from causing the desctruction of the cell and others nearby. The removal of the individual defective cell is facilitated by a printed readout showing each individual cell voltage together with a characteristic number identifying the cell. This arrangement permits the printed record to become a permanent part of the operational log of the particular vehicle.

STATEMENT OF THE OBJECTS OF THE INVENTION

It is accordingly an object of this invention to provide an improved monitoring system for storage batteries.

Another object of the present invention is to provide an improved monitoring system for use in conjunction with silver-zinc batteries.

Another object of this invention is to provide a battery monitoring system which indicates the highest and lowest individual cell voltages of a plural cell storage battery.

Still another object of this invention is the provision of a battery monitoring system for plural cell storage batteries which prints out the individual cell voltages of component cells of the battery system.

Another object of this invention is a battery monitoring system which monitors individual cell voltages of a plural cell storage battery system during both charge and discharge cycles.

Other objects, advantages, and novel features of the invention will become apparent from the following detailed description of the invention, when considered in conjunction with the accompanying drawings.

DESCRIPTION OF THE PREFERRED EMBODIMENTS

Figure 1:
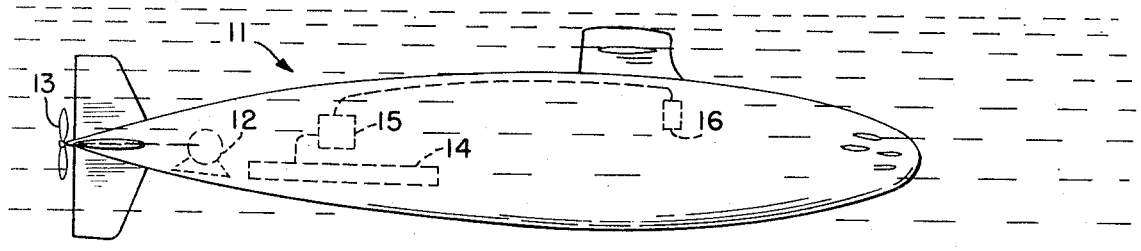
FIG. 1 is a side elevation view of a submarine showing the invention.

Referring to FIG. 1, submarine 11 is propelled by an electric motor 12 connected, via conventional drive means, to screw 13. Electric motor 12 is supplied electrical energy by a multicell storage battery 14. In practice, battery 14 customarilly includes two separate banks of wet cells which may be used individually or, when desired, interconnected to supply electrical energy from the entire battery complement. The battery control station 15 is connected to battery 14 and is physically located near the battery compartment. A remote readout 16 may be placed elsewhere in the submarine 11, in the control space, for example, and is connected to battery control station 15 by suitable electrical cabling, shown as a broken line.

Although the invention is described and it pertains to submarine vehicles, it will be apparent that other applications and vehicles may employ the invention with equal, important benefits. For example, silver-zinc batteries, because of their compact construction and favorable power to weight ratios, may find utilization in aerial vehicles, space capsules, space habitats, and underwater manned habitats. The invention, of course, performs with equally advantageous results in any of these environments.

Figure 2:
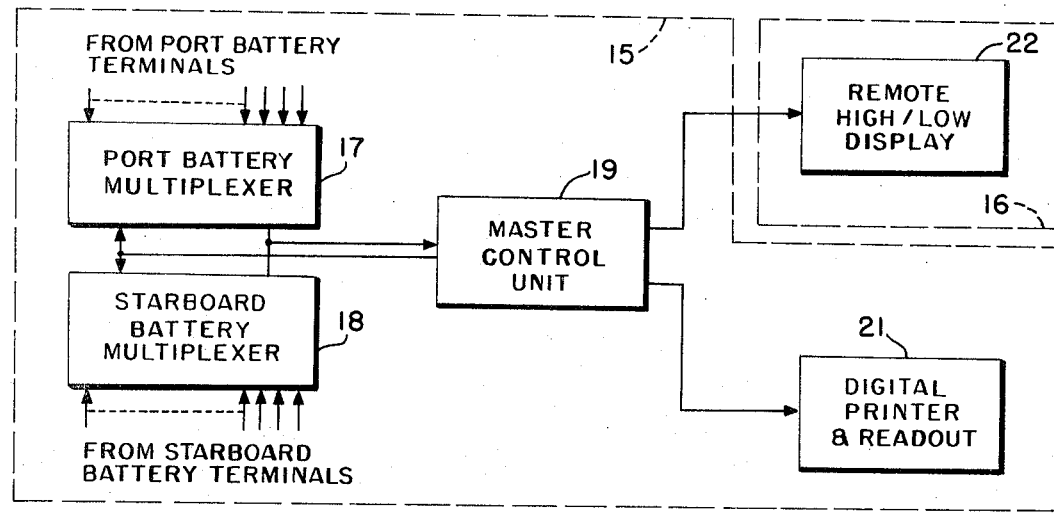
FIG. 2 is a diagram of the battery monitor system of the invention illustrating the connection between major components of the system.

Referring to FIG. 2, battery control station 15 is seen to comprise four major units and remote readout station 16 to comprise, simply, a remote high-low display 22. Battery control station 15 includes the port battery multiplexer 17 and a starboard battery multiplexer 18 which are connected to a master control unit 19 to receive control signals therefrom. Of course, multiplexers 17 and 18 feed the individual cell voltages, hereafter termed ICV's, to the master control unit. Each of the multiplexers 17 and 18 receive inputs from each of the individual cells as will be hereafter explained, and sequentially and selectively feed the ICV from the respective cells to the master control unit.

Master control unit 19 includes the various clocks and logic circuits, to be more fully explained, which control the sequential operation of battery multiplexers 17 and 18 as well as the necessary logic controls to permit operational flexibility of the battery monitor system. The master control unit 19 has outputs to the remote readout 16 as well as to a digital readout 21.

In the system illustrated in FIG. 2 there are but two battery multiplexers 17 and 18. Of course, in systems employing more than two banks of multicell batteries, the multiplexer circuit may be provided for each bank or other subdivision of storage cells, as may be desired.

Figure 3:
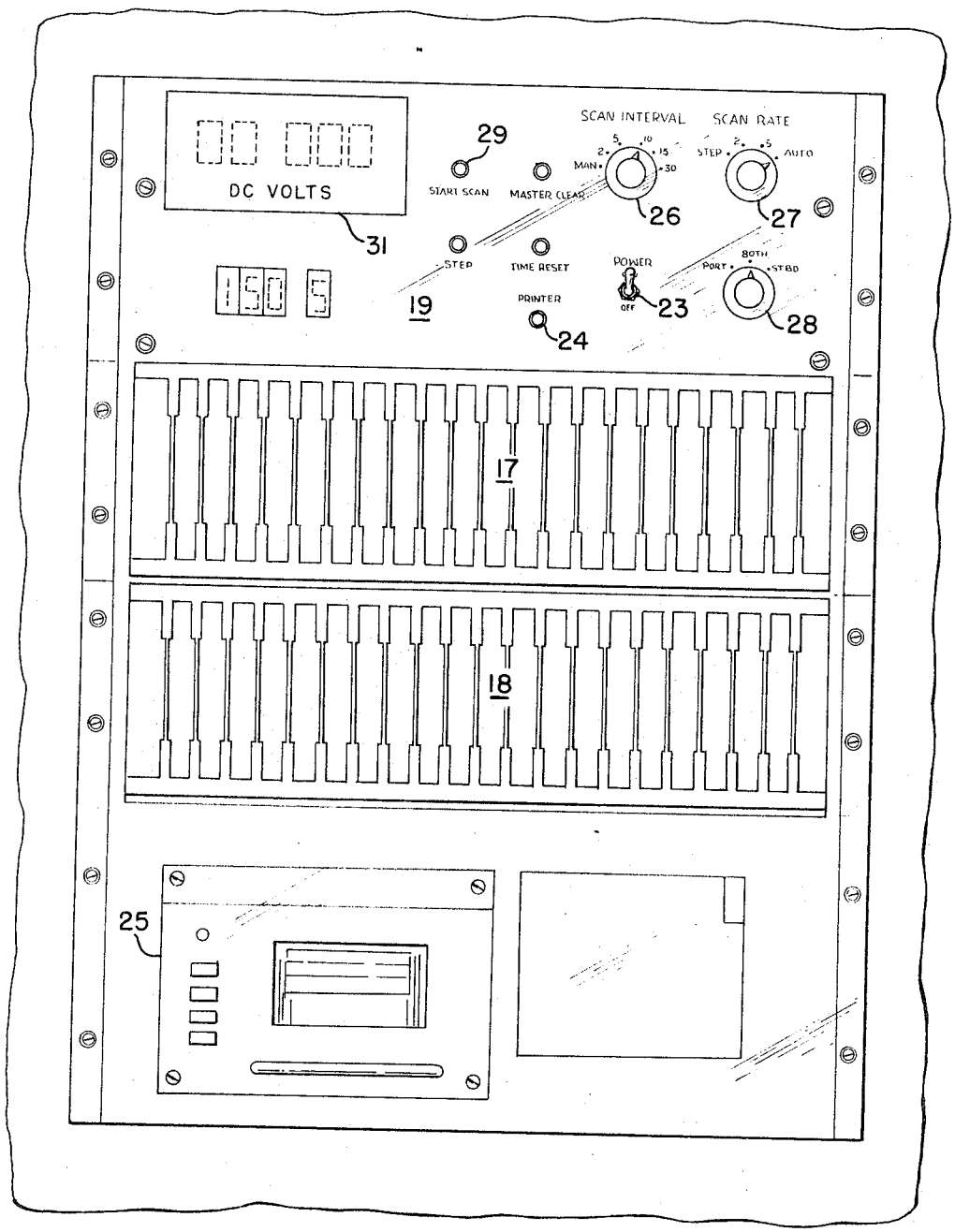
FIG. 3 is a front elevation view of the major components of the invention.

Referring to FIG. 3, master control unit 19 is illustrated as mounted in a common standard relay rack. The port battery cell multiplexer 17 and the starboard battery cell multiplexer 18 are similarly mounted in adjacent panels located in the same standard relay rack beneath master control unit 19.

As illustrated, master control unit 19 contains the various switches and operational controls for the battery monitors for the battery monitor system. Power switch 23 energizes the entire system from an inoperative condition. Similarly, printer switch 24 controls the flow of ICV and control data to a digital printer 25 which may be conveniently mounted in a fourth panel mounted in the same relay rack as master control unit 19. A selector switch 26 is positioned on the front panel of control unit 19 and selects the scan interval at which the battery monitor system operates. A similar switch 27 selects the scan rate and a third rotary selector switch 28 allows the operator to monitor both battery banks together or either bank individually. A variety of other monitor controls are also included on master control unit 19 such as, a start-scan pushbutton switch 29, which is used to commence the scan operation when the scan interval switch 26 is placed in the "MAN." position. As will be explained, this position permits a manual mode of operation. A digital voltmeter 31 is also mounted as a component part of master control panel 19. The function of the individual control devices will become more apparent as the description of the system proceeds and their use will be better understood in conjunction with the description of the preferred mode of operation, which follows.

As shown, port and starboard multiplexers 17 and 18 are comprised by plurality of plug-in circuit boards each containing a portion of the circuitry required to sample and select the various ICV's. The number of panels comprising each multiplexer may be varied to suit the particular battery cell arrangement being monitored and, similarly, the number of monitor circuits on each panel may be varied to correspond to the total number of cells required to be monitored. However, for purposes of explanation, it shoudl be noted that the operational unit of the invention employs 21 printed circuit boards in each multiplexer and each circuit board provides eight circuits in order to measure the two battery banks of 165 cells each used aboard a deep submergence research vehicle.

Figure 4:
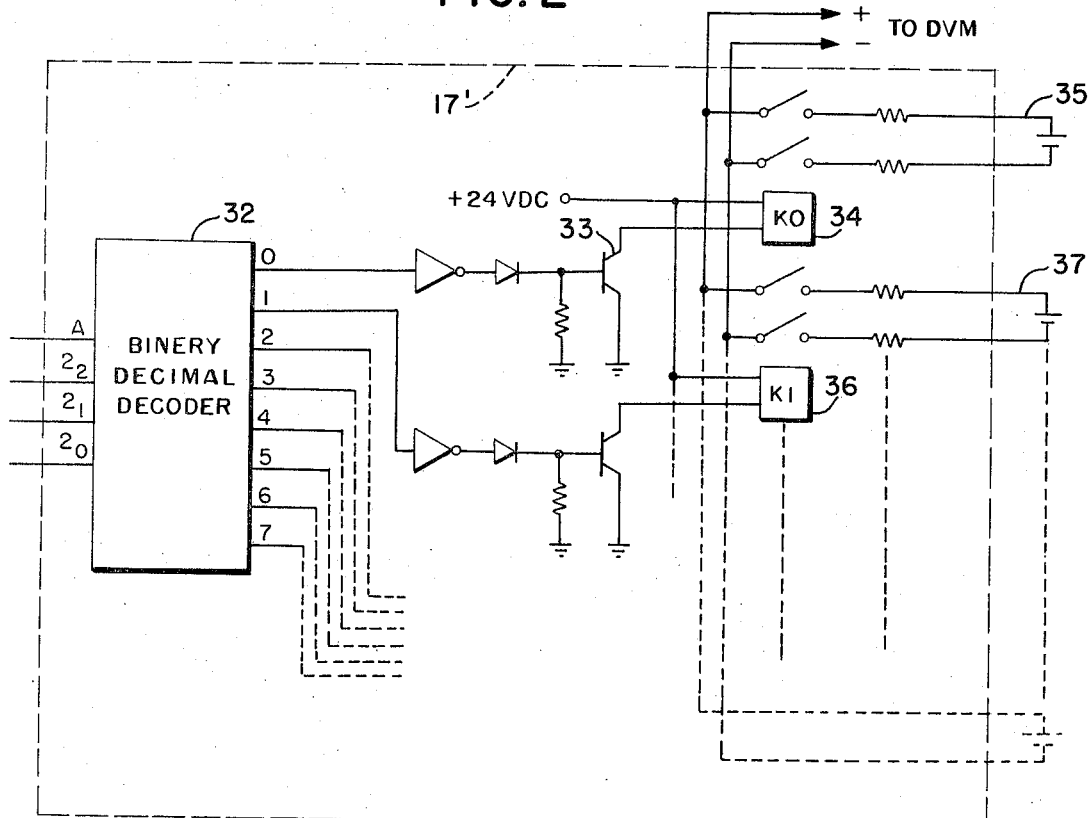
FIG. 4 is a schematic showing of a portion of one of the multiplexer cards used in the invention.

Referring to FIG. 4, the individual circuit boards comprising multiplexer 17 will be receiving input signals which are connected to binary-coded-decimal-to-decimal decoder 32. Two of the decoder outputs are indicated corresponding to the 0 and 1 outputs. Of course, similar networks are coupled to each of the remaining outputs to provide eight operational stages which are enabled in response to the binary code supplied to BCD-to-decimal decoder 32. Tracing the circuit from the 0 output of BCD-to-decimal decoder 32, the logic impulse is fed to a transistor switch 33 by means of a suitable signal handling network shown as comprising an inverter, diode and resistance network. A switch 33 controls the operation of a double-pole, single-throw relay 34 which is resistance coupled to measure the cell voltage of an individual battery cell indicated at 35. Of course, cell 35 is connected in series with cell 37 in a suitable power circuit, not shown. When relay 34 is closed, cell 35 is connected through suitable fusing resistors to a input bus which is shown as going to a digital voltmeter. Similarly, a relay 36 is associated with cell 37 to connect the output thereof to the measuring bus. As previously noted, each circuit board contains provisions for measuring eight individual cells and, in addition, is connected to the following circuit board to permit sequential operation thereof as will now be described.

Figure 5:
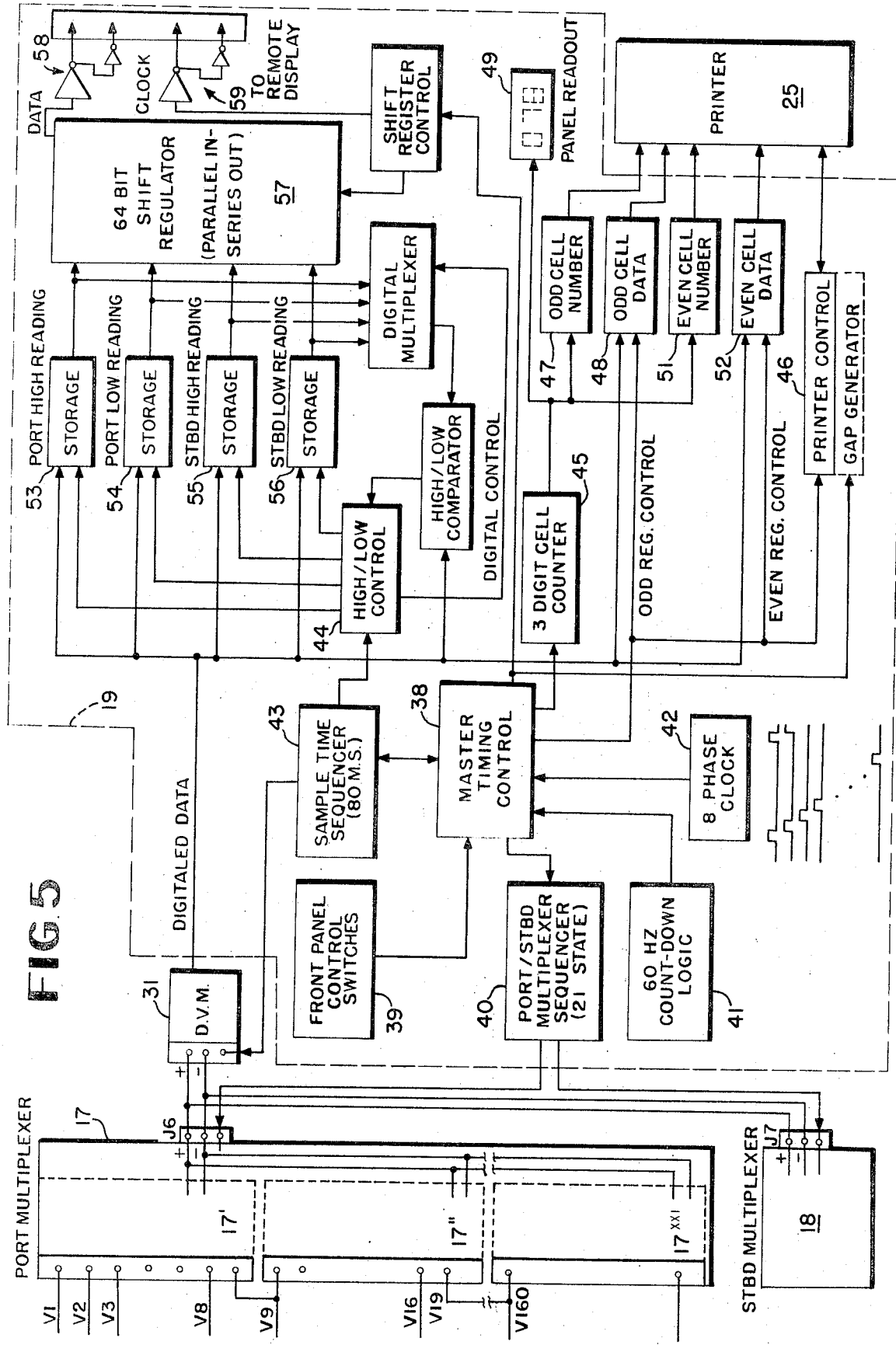
FIG. 5 is a diagrammatic presentation, including logic flow, of the major portion of the system of the invention.

Referring to FIG. 5, port multiplexer is shown as comprising a plurality of individual circuit cards labeled $17'$, $17''$, etc. to the ultimate board $17^{xxi}$. The output of port multiplexer 17 is connected via connector J6 to a digital voltmeter 31. Additionally, digital voltmeter 31 receives an input from starboard multiplexer 18 through a similar connector J7.

Digital voltmeter 31 may be of any conventional type which receives an analog voltage input and converts such an input to a digital output which is displayed on the meter as well as transmitted to other circuits for utilization. However, for purposes of completeness, it should be noted that the system of the invention uses a digital voltmeter manufactured by Newport Laboratories, Inc., Santa Ana, California, and identified as a series 2000 digital panel meter.

Digital voltmeter 31 is connected to master control unit 19 to receive triggering signals therefrom and to transmit the digital data thereto. The component parts of master control unit 19 are common state-of-the-art logic circuits and clocking circuits and are connected in the circuit arrangement illustrated in FIG. 5. As shown, a master timing control 38 is programmed by the panel control switches collectively indicated at box 39, and serves as an impedance matching and coupling network to route the various clock and logic signals to their respective utilization circuitry. Thus, a variety of circuit arrangements might be used for master timing control 38 including relay and switchbacks as well as logic circuits. In the preferred embodiment, a series of logic circuit gates are employed and the switch positions are controlled from the panel to enable and disable respective ones of the gates to produce the time sequence and addressing functions necessary for the operation of the invention. In particular, master timing control 38 receives input logic signals from a 60 Hertz countdown logic 41 and an eight-phase clock 42 as well as a shut-off signal received from the sample time sequencer 43 which also provides 80 millisecond gates to enable digital voltmeter 31 at appropriate intervals determined by eight-phase clock 42.

The eight-phase clock 42 may be any appropriate clock mechanism known in the prior art producing the required clocking signals. In the exemplary embodiment of the invention the eight-phase clock 42 generates clock pulses of approximately 500 nano-seconds pulse duration and separated by 4 micro-second intervals. This eight-phase output serves as the master timer for the entire monitor system, as will be understood by those familiar in the logic switching arts. In the illustrated example, eight-phase clock 42 contains a free-running master clock which has an output of a 64 nano-second square wave. In the developmental model this master clock has consisted simply of five logic inverters placed in series so as to utilize their internal logic delay connected, via an appropriate feedback line, to the input of the system so as to produce the required oscillation at the square wave frequency specified. Of course, should other master frequency intervals be desired, appropriate changes in the clocking mechanism may be provided to produce the desired clocking frequency. The output of this master clock is then fed through an inverter into a divide-by-eight counter where the 64 nano-second square wave pulse is expanded by a factor of eight so as to approximate the 500 nano-second square wave. The output of this divide-by-eight counter is then transferred to an appropriate shift register where the various Q and $\bar{Q}$ outputs from this register are combined in a series of AND gates to produce the actual eight-phase clock signal illustrated below eight-phase clock 42.

The sample time sequencer 43 operates in a similar fashion to produce internal clock output signals in the millisecond range which are used for the cycle control of the digital voltmeter 31 and as synchronization signal for a high-low control 44 and for various other internal clocking sources. For example, one such use is in printer 25, as the trigger for the paper advance.

As previously noted, a variety of clocking mechanisms to produce a millisecond pulse may be employed, however, in the illustrated arrangement, the 80 millisecond sequencer signal is set up by a NAND gate multivibrator that operates to produce a 1 millisecond square wave output signal. This output signal is inverted and utilized by a shift register to generate a series of square waves having ten millisecond period separated by a one millisecond interval. These staggered pulses are fed to a divide-by-eight counter where their further processing proceeds in the same manner as that used in eight-phase clock 42. That is, signals are produced having a 80 millisecond period but staggered at periods corresponding to the ten milliseconds. As will be obvious to those familiar with the logic programming arts, the various staggering provides for proper sequencing and routing of various signals.

When the digital voltmeter 31 is indexed to receive data from the ICV's supplied by various multiplexing boards 17 and 18, the energization of the appropriate relay 34, 36, etc., shown in FIG. 4, connects digital voltmeter 31 to the individual cell being monitored for the reception of the analog voltage of that cell. The timely energization of these relays is accomplished by the port/starboard multiplexer sequencer 40 which sequentially selects the individual circuit board and the particular relay on the board. Any suitable multiplexer may be used for this purpose and, of course, the switching time is dependent on the operational characteristics of the particular digital voltmeter 31 employed. In the developmental model of the device, port/starboard multiplexer 40 includes an eleven-gate shift register and a binary counter. The function of the shift register is to provide the sequential logic signals which are used to address the individual relay boards numbered $17^I$ to $17^{XXI}$ and the binary counter's function is to set up the recurring signals which are utilized by each board to address the individual relays located on the board. Since a variety of basic layouts of logic circuits will accomplish this sequential switching, a further detailed description thereof is considered unnecessary for the understanding of the invention. However, it should be noted that the particular relay address is transferred via master timing control 38 to a three-digit cell counter 45 which displays on panel readout 49 the particular cell and battery being monitored at that time. This information is also fed to the odd cell numbering circuit 47 and the even cell numbering circuit 51 which are used as input logic for printer 25. Of course, this information is transferred only in the event that the printer 25 is being operated to provide a permanent indication of the individual cell voltages.

It should be noted, at this time, that the printer ON switch 24 (FIG. 3) is connected, via master control 38, to provide a data link for printer 25 and does not serve as a power control for that printer. The power control functions are provided by the internal power supply of printer 25, which in the developmental model of the invention is a Digital Data Printer, Model 800, made by Newport Laboratories, Inc., of Santa Ana, California, and controlled by appropriate switching on the front thereof. Should another printer be used for printer 25, switch 24 could be wired to control the power supply function as well as the data link without departing from the scope of the invention.

Likewise, it should be obvious that the generation of the various addressing signals by port/starboard multiplexer 40 is dependent upon the position of battery selector switch 28 (FIG. 3) which functions to address the output of port/starboard multiplexer 40 to either the port multiplexer 17 or the starboard multiplexer 18 either exclusively or sequentially.

The digital data output from digital voltmeter 31 is fed to odd cell data circuit 48 and even cell data circuit 52 to be stored in digital form for printer 25. Odd cell data circuit 48 and even cell data circuit 52 also receive clocking signals for master timer control 38 which serve to clear this storage between adjacent ICV readings. In a similar manner, printer control 46 receives an appropriately spaced interior pulse which enables printer 25 to print particular stored signals within the data circuits 48 and 52. This printer control includes a gap generator in the developmental model permits printer 25 from printing data at the end of a given cell sequence until the printing paper has been advanced a predetermined number of spaces, seven in the developmental model.

As previously described, an advantageous object of the present invention to the display only the high reading and low readings associated with the individual battery banks in operation. As will be more completely described, the high cell voltage is an indication of the state of charge of individual battery whereas the low cell voltage is monitored to indicate the existence of a defective cell. This novel display is obtained by the particular high/low comparator circuit 62 and associated logic circuitry which is fed digital data from digital voltmeter 31. Basically, the high/low comparator consists of a comparison logic circuit and a transmission logic circuit. Transmission logic changes the parallel individual cell voltage highs and individual cell voltage lows into serial data for transmission to the remote display in the control space of the submarine vehicle. The remote display, then, consists simply of a serial to parallel data converter and appropriate display indicators.

The digital voltmeter 31 transmits digital data consisting of binary coded values which correspond to the units of volts, hundreds of millivolts, tens of millivolts, and units of millivolts. These four values then provide a four-digit readout indicating the individual cell voltages to millivolt accuracy.

These digitized terms are fed directly to high/low comparator 62 and, as previously described, to the odd cell data circuit 48 and the even cell data circuit 52 which will serve as buffer storage circuits for printer 25.

High/low comparator 62 produces five gating signals which are fed to the high/low control 44 to be gated to the respective port high reading storage circuit 53, port low reading storage 54, starboard high reading storage 55, and starboard low reading storage 56. Quite naturally, this gating occurs in the timely 80 millisecond signals supplied to high/low control 44 by sample time sequencer 43.

Basically, the high/low comparator includes a storage for each of the voltage binary signals, units of volts, hundreds of millivolts, tens of millivolts and units of millivolts, which are compared in that order with the next sample signal. The same basic circuitry is needed for the high as well as the low storage. Thus, considering the high comparator logic, if the incoming signal is higher than the stored signal the storage is cleared and the new high signal replaces it in the storage circuit. If, on the other hand, the incoming signal is lower in value in the units of volts capacity, the signal in the high storage does not change. If the signal is the same as that stored in the unit volt storage comparison is then made at the next stage of the signal, i.e., hundreds of millivolts, in the same fashion. That is, if the signal is higher it replaces the stored signal as the new high. If lower, no change ia made.

Similarly, a comparison is made for the lowest reading of individual cell voltages in the same fashion but with the comparison being made to change the stored value upon a lower digital signal being presented rather than the higher signal.

This sequence of comparison goes on with the reading of the 165 individual cell voltages of the selected battery. Upon each step of the sequencing of the gating, the contents of high/low registers are fed to the sixty-four bit shift register 57. The registers are, of course, constantly updated as new highs and new lows are fed to the high and low storage circuits 53 through 56. When the comparison sequence is complete, the 64 bit remote transmit section clocks out the registered port and starboard high and low values in a serial form. This material is fed, via appropriate inverter amplifier networks 58 and 59, to the remote display 16 (FIG. 1) as well as to other displays as might be required.

High/low control 44 provides a digital control signal to digital multiplexer 61 to synchronize the transfer of the stored individual cell voltages to the high/low comparators 62.

Thus, it may be seen that the first individual cell voltage recorded is fed to both the high reading storage 53 or 55 and low reading storage 54 or 56, depending on the battery being monitored, i.e., either port or starboard. This stored value is then transferred via digital multiplexer 61, to high/low comparator 62 where it is compared with the next sample individual cell voltage. If that voltage is higher than the previous stored voltage it replaces that signal in the high reading storage circuit. If lower, the signal replaces the initially recorded signal in the low storage. The third sampled individual cell voltage is then compared with these two values and if it exceeds or falls below these values it replaces the stored reading as a new high or a new low.

A variety of comparator circuits are known in the prior art to make digital comparisons and selection as among the various circuits is deemed a matter of choice to the proficient artisan and, accordingly, no particular circuit arrangement is shown. However, it should be noted that it has been found advantageous to include a zero reading gate in the high/low comparator which may be threshold at any particular desired voltage such that when an individual cell is physically jumpered out of the battery system, spurious voltages that may exist on these cells will not be seen as a new low voltage value thereby displacing the real values from the low reading storage. In the developmental model of the invention, this threshold has been conveniently set at 0.399 volts. Of course, the particular voltage used for the zero reading gate would necessarily be selected in dependence upon the particular type of battery being monitored.

The foregoing description is considered sufficiently complete to permit one versed in the logic circuit design of the electronic arts to make and use the invention. However, it should be noted, for purposes of completeness, that the various circuits follow the current state-of-the-art design practice as indicated by standard reference works in the field. For example, "Handbook of Pulse-Digital Devices for Communication and Data Processing" by Harry E. Thomas, Prentice-Hall, Inc., Englewood Cliffs, New Jersey, Library of Congress Catalog Card No. 72-768 and "Computer Dictionary and Handbook" by Charles J. Sippl, Howard W. Sams and Co., Inc., Indianapolis, Indiana, Library of Congress, Catalog Card No. 66-21405 are useful standard works indicating the nature and design practice for the various circuits not specifically described above.

Although the foregoing description is believed sufficient to enable such a skilled worker to make the invention, the invention will be better understood with reference to the following description of the preferred mode of operation.

PREFERRED MODE OF OPERATION

Referring to FIGS. 1 and 3, when it is desired to monitor batteries 14, the invention is activated by energizing the system using switch 23 (FIG. 3). If a printed readout of the monitored battery condition is desired, the printer 25 is energized by an integral control and the printer switch 24 is activated to feed the scanned battery data to printer 25.

Switch 26 is then set to a desired scan interval for automatic operation or the "MAN." position for manual operation. In the "MAN." position the scan is commenced by a suitable start scan control 29. The scan rate switch 27 is placed in one of the two fixed times or into an automatic mode. As will be obvious to those familiar with logic circuit and design art, any number of fixed scan rates may be employed, however, the two shown have proven satisfactory for operation of the instant device. For a more rapid scan of the entire battery pack scan rate switch 27 may be placed in the automatic mode in which case the next cell is selected as soon as the previous cell's voltage has been recorded or processed by the described storage logic circuit. A "Step" position is also provided on the scan rate switch 27 and when such a rate is selected the scan is controlled by step switch which must be activated to select the next cell in sequence. The batery select switch 28 is provided to select either a port or starboard type or both as conditions may warrant.

A "master clear" switch is also provided to return the entire battery monitoring system to its initial condition at a desired time before the complete scan is completed. Likewise, a "time reset" switch has proven useful in the developmental model of the invention to independently restore the several clocking circuits, previously described, to their original position.

When the master control unit 19 has been programmed to produce the desired operation, ICV's are monitored and displayed both on the conventional digital voltmeter readout which may be seen on the face of master control 19 together with particular cell number displayed on the panel readout 49. At the remote readout 16, the highest and lowest cell voltage for each scan interval are displayed so that operational personnel of the vehicle may be apprised of the general condition of the power source.

The highest individual cell voltage display is useful as an indicator of the general state of the battery power source. The lowest individual cell voltage is useful in determining the presence of a shorted or "hot cell" and may give warning of the cell's development of such a condition in automatic scan mode by showing a steadily declining lowest cell voltage. When such a condition occurs, operational personnel may determine the identity of the specific cell causing the trouble by reference to digital voltmeter 31 and panel readout 49 or by reference to the printed readout produced by printer 25. When the identity of the cell is thus determined, the cell may be shorted out of the battery pack by conventional means.

Thus it may be seen that the invention provides a valuable indication of the condition of multicell battery power source. Such an indication has proven extremely useful in the operation of various submarine research vessel and has greatly minimized power failures and extended the operational oife of the battery power source which has resulted in a great savings of both time and financial resources.

The foregoing description taken together with the appended claims constitute a disclosure such as to enable a person skilled in the electronics and computer logic arts having the benefit of the teachings contained to make and use the invention. Further, the structure herein described meets the objects of the invention and generally constitutes a meritorious advance in the art unobvious to such a skilled worker not having the benefit of these teachings.

What is claimed is:

1. A battery monitor system for use with multicelled battery comprising:
   a parallel-in-series-out multiplexer circuit means connected to the multicell battery to provide an input for each cell thereon for sequentially scanning each cell and producing an analog output signal corresponding to the voltage output of the scanned individual cells;
   programmer means connected to said parallel-in-series-out multiplexer circuit means for providing scanning signals to trigger the sequential scanning of the battery cells;
   digital voltmeter means connected to said parallel-in-series-out multiplexer circuit for converting the analog voltage signals to digital signals corresponding to the individual cell voltages.
   high/low comparator means connected to said digital voltmeter means for determination of the highest and lowest individual cell voltages; and
   display means connected to said high/low comparator means for visual display of the highest and lowest individual cell voltages obtained in each sequential scan of the multicell battery.

2. A battery monitor system according to claim 1 further including a printer readout effectively connected to said programmer means and to said digital voltmeter means for making a printed record of the individual cell voltages and identifying indicia corresponding to the order in which the cell was scanned.

3. A battery monitor system according to claim 1 in which said parallel-in-series-out multiplexer means includes a plurality of multiplexer units each connected to a different multicell battery for monitoring a plurality of multicell batteries in sequence.

4. A battery monitor system according to claim 3 in which the parallel-in-series-out multiplexer comprises a plurality of individual multiplex circuit assemblies each containing a plurality of switching circuits which are selectively responsive to the scanning signals supplied by said programmer means.

5. A battery monitor system according to claim 4 in which each multiplex circuit assembly includes a binary-to-decimal decoder circuit.

6. A battery monitor circuit according to claim 1 in which said programmer means includes a visual display means to indicate the particular cell being scanned for individual cell voltage.

7. A battery monitor system according to claim 6 in which the aforesaid digital voltmeter includes a visual readout of the measured individual cell voltage.

8. A battery monitor system according to claim 1 in which said high/low comparator means includes:
  storage means connected to said digital voltmeter means for selectively retaining the digital output thereof;
  digital multiplexer means connected to said storage means for transfer of the stored digital signal; and
  comparator circuit means connected to said digital multiplexer means and to said digital voltmeter means to receive input signals therefrom and effectively connected to said storage means to provide selective access signals therefore for comparing the individual cell voltage output signals from said digital voltmeter with those stored in said storage means and accessing the storage means to store the digital voltmeter signal when it differs from the stored signal in a predetermined fashion.

9. A battery storage system according to claim 8 wherein said storage means includes a high storage circuit and a low storage circuit.

10. A battery storage system according to claim 1 in which the multicell battery is a silver-zinc wet cell battery.

* * * * *